May 25, 1943.  A. E. STANLEY  2,320,054
METHOD AND APPARATUS FOR TREATING PINEAPPLES
Filed Feb. 12, 1942  3 Sheets-Sheet 1

INVENTOR.
ALBERT ERNEST STANLEY
BY
Edgar H. Kent

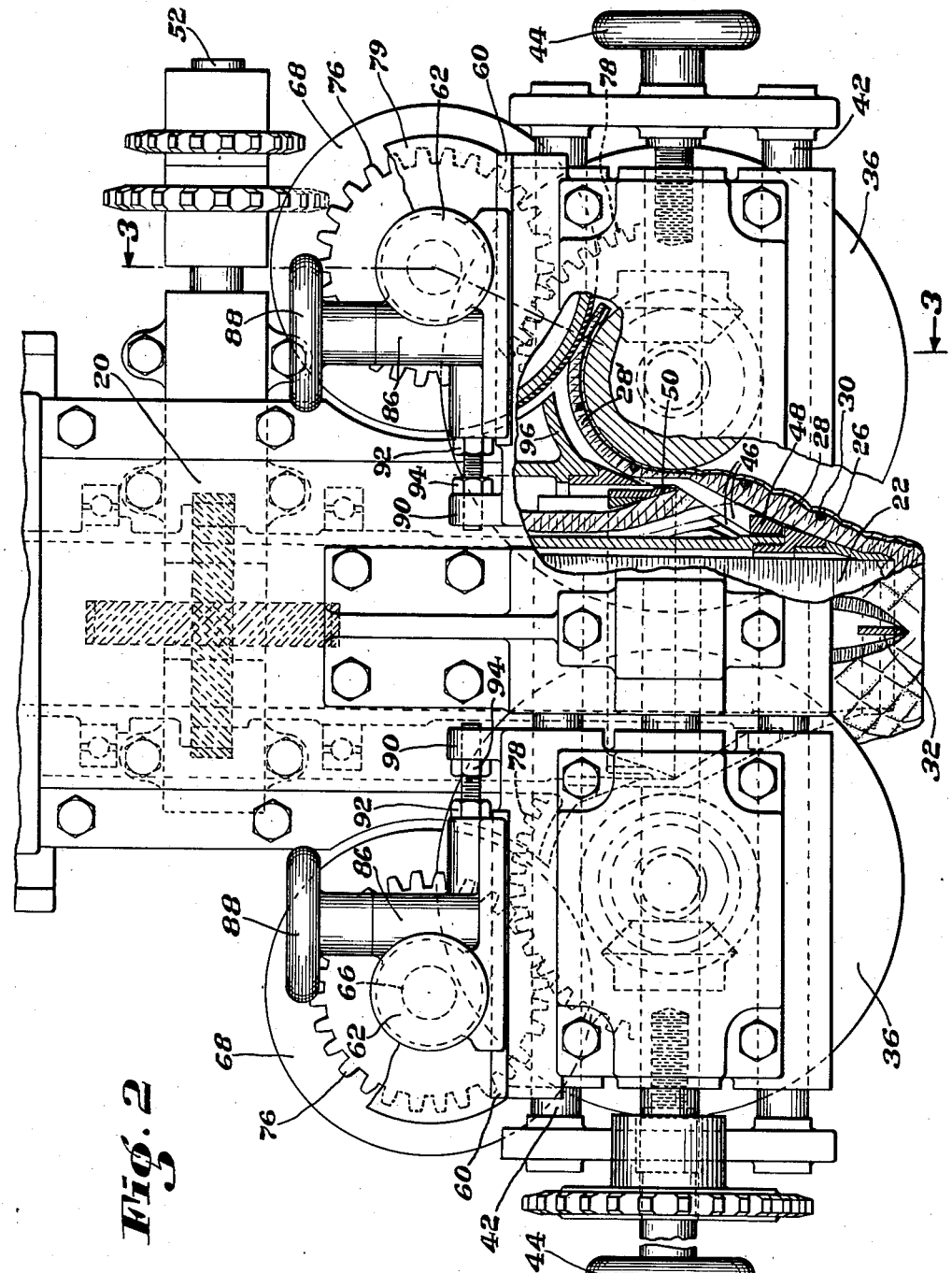

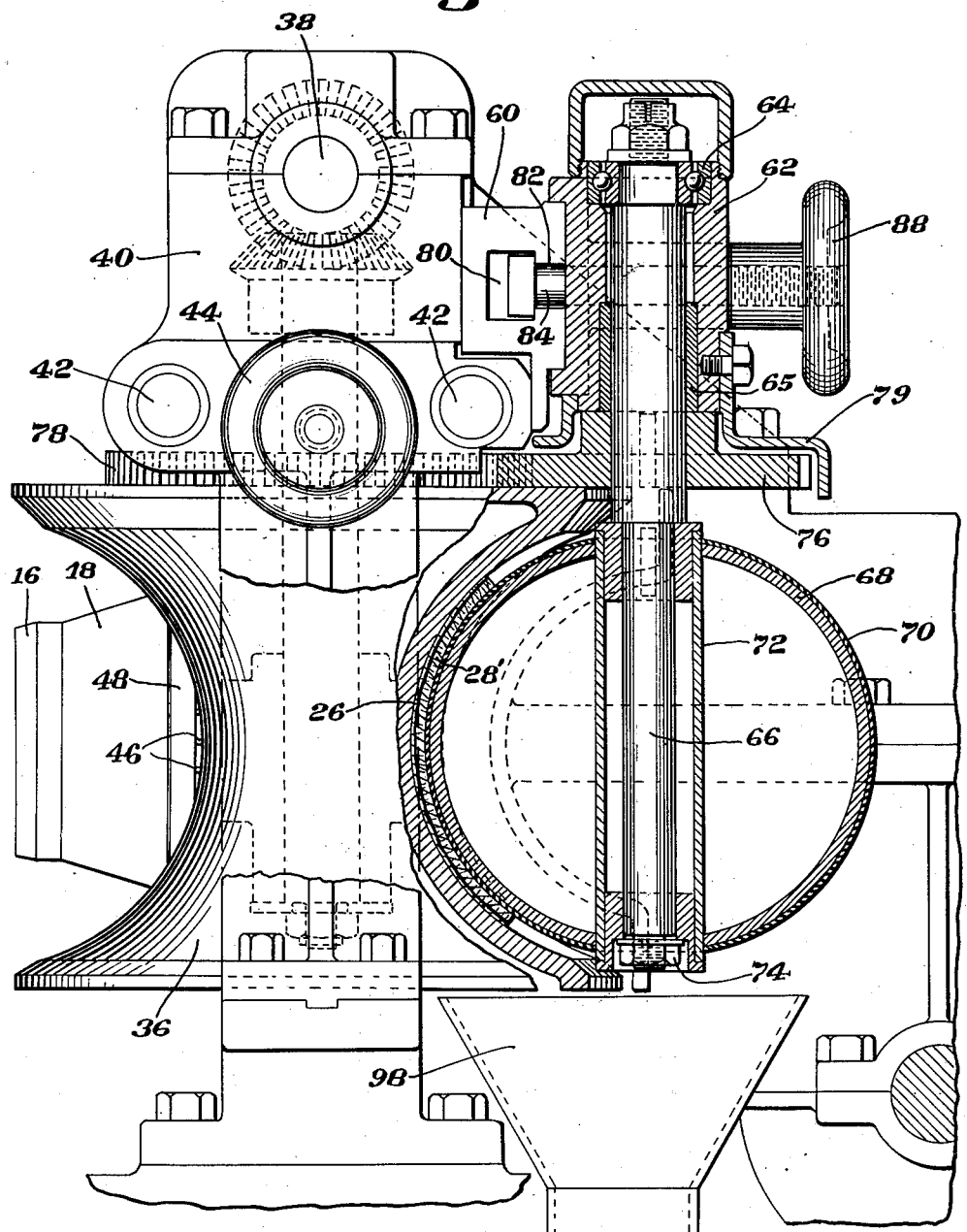

Patented May 25, 1943

2,320,054

UNITED STATES PATENT OFFICE 2,320,054

METHOD AND APPARATUS FOR TREATING PINEAPPLES

Albert Ernest Stanley, Honolulu, Territory of Hawaii, assignor to Hawaiian Pineapple Company, Limited, Honolulu, Territory of Hawaii, a corporation of Hawaii Application February 12, 1942, Serial No. 430,571

11 Claims. (Cl. 146—6)

This invention relates to methods and apparatus for treating fruit, and more particularly to a method and apparatus for treating pineapples to remove the edible meat and juice from the shells preliminary to canning.

In preparing pineapples for canning, they are usually first subjected to a "sizing" operation wherein the fruit is cut longitudinally to remove from within the shells a cylinder of pineapple meat of predetermined diameter, which is then trimmed, cored and sliced. As pineapples differ in size and are not of uniform diameter throughout their length, the sizing operation leaves a substantial quantity of pineapple meat upon the shells in a layer which varies in thickness in different parts of each shell and as between different shells.

Difficulties are encountered in attempting to recover this edible substance from the shells after sizing. The inner surface of the shell is not smooth but contains numerous projections or indentations into the meat layer, forming the "eyes" of the pineapple. If it is attempted to plane off this meat layer with a knife edge cutting along the inner surface of the shell, these projecting shell portions will be cut off, fouling the edible substance. Consequently, it is not feasible to plane off the meat close to the shell. If the shells are subjected to squeezing to expel the juice from this layer, they are likely to be crushed and broken to an extent sufficient to cause expulsion of the oils which they contain and these oils mix with and contaminate the juice.

The principal object of the present invention is to provide a novel method for treating pineapple shells as removed in the sizing operation, and novel apparatus for practicing the method, whereby the edible substance left on the shells may be substantially completely, economically, separated therefrom without contamination of this substance by extracting therewith either the oils of the shells or bits of the shell itself. These and other objects and advantages of the invention will be fully apparent from the ensuing particular description and from the accompanying drawings, wherein:

Fig. 2 is a top plan view, with parts broken away, of part of the apparatus shown in Fig. 1;

Fig. 3 is a partial section, partial end elevation on the lines 3—3 of Fig. 2.

Figure 1:
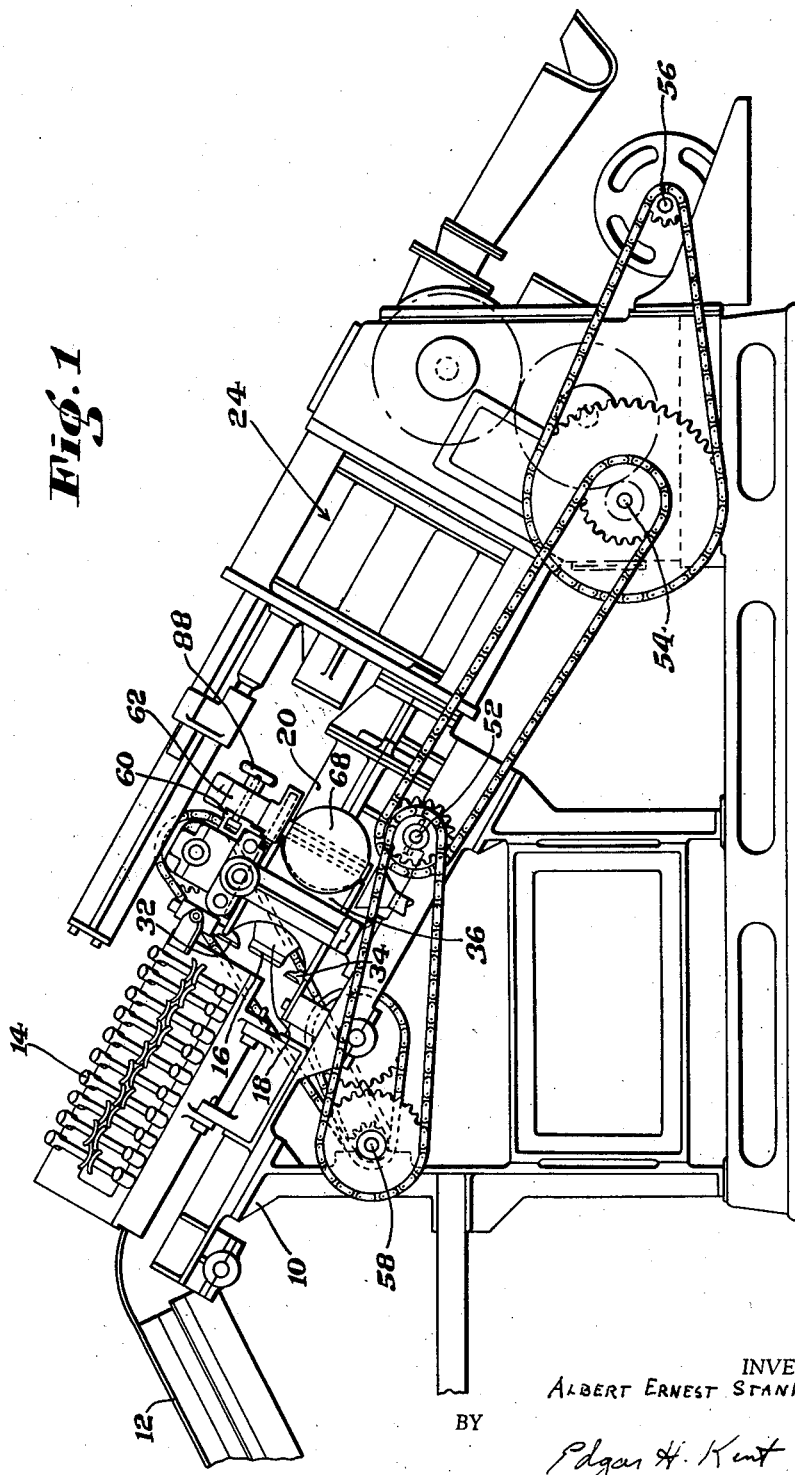
Fig. 1 is a side elevation of a pineapple sizing and coring machine embodying mechanism of the present invention.

In the practice of the invention the pineapples are sized in any usual manner as by pressing them endwise against a rotary tubular cutter. The shells are then subjected to a planing operation in which a portion of the layer of meat left on the shells in the sizing operation is cut off, the cut being made at a controlled depth such as to clear the innermost ends of the eyes penetrating into the meat, so that no shell portions are removed in this operation. This operation recovers a substantial quantity of the meat, reducing, and also leveling off, the previously uneven layer of meat. The shells are then subjected to a final operation in which the remaining layer of edible substance is subjected to a carefully controlled rubbing action which operates by pressure exerted parallel to the shells to rupture the juice cells and remove the edible juice from this layer without either expelling oils or removing pieces from the shell itself.

Preferably the entire process is carried out while preserving the natural transverse curvature of the shells so that cracking of the shells, which is likely to take place when they are flattened, with consequent release of oils, is avoided.

For sizing the pineapples and for planing off the inner part of the layer of meat left on the shells after sizing, I may utilize existent types of apparatus, a preferred example being that shown in my prior Patent No. 2,195,193, dated March 26, 1940. The present invention, however, as will hereinafter appear, provides novel apparatus for use in the practice of the final step of the process, that of rubbing out the juice from the balance of the meat layer that remains after planing.

The invention will now be more particularly described with reference to the form of apparatus shown in the accompanying drawings, which is a sizing and planing machine of the type shown in my aforesaid patent, to which has been added novel co-operating mechanism of the present invention.

The machine shown in the drawings has an inclined frame 10 provided at one end with a conveyor chute 12 which feeds the pineapples successively through a centering device 14 and presents them endwise to a cylindrical sizing knife 16, fixed to the end of a tube 18 which is continuously rotated within a casing 20. Knife 16 cuts longitudinally through the pineapples separating from within the shell an interior cylinder of meat 22 which is carried downwardly within tube 18 to trimming and coring apparatus indicated at 24. The pineapple shells 26, as severed from the cylinder 22 by the knife 16, have upon their interior surface a layer of meat 28 of substantial, varying thickness into which the eyes 30 of the fruit project (see Fig. 2).

Located immediately in advance of the sizing knife 16, are a pair of fixed knives 32 and 34, which cut longitudinally through the shells 26 and meat layer 28 at top and bottom of the pineapple so that the shell is removed by the sizing knife in two halves, one at each side of the vertical diameter of the knife 16. As each of these shell portions is separated from the cylinder 22 by knife 16, its outer surface is engaged by the surface of one of a pair of concave feed rollers 36 rotatably mounted upon a vertical axis at each side of the axis of knife 16 and tube 18.

Preferably, as indicated in the drawings, and as more fully shown and described in my aforementioned patent, each of the rollers 36 is rotatably suspended from a horizontal drive shaft 38 located above the knife 16 and extending transversely of the axis of said knife, and is slidably operatively connected to the shaft 38 by gearing enclosed within a casing 40 which is slidable longitudinally of said shaft and also of a pair of supporting rods 42 arranged parallel to the shaft 38. By means of this arrangement, each roller 36 may be shifted toward or away from the axis of knife 16 and tube 18 by adjustment of a hand wheel 44 which acts to slide the corresponding casing 40 longitudinally of rods 42 and shaft 38, the casing carrying with it the roller 36 and the drive connections suspending the roller from shaft 38.

Fixed to the forward end of casing 20 and surrounding the forward end of tube 18 is a grid composed of grid bars 46 extending forwardly and sloping inwardly from the casing 20 and having ther forward ends connected by a ring 48 which closely but loosely surrounds casing 20 adjacent knife 16. The grid formed by bars 46 is of general frusto-conical outer shape coaxial with tube 18, having its greatest radius nearest the casing 20. The curvature of the concave surface of the rollers 36, on any vertical section, is substantially a semi-circle of somewhat larger radius than the greatest radius of the grid and the rollers are so mounted that their rotating surface passes closely over the rearward ends of the grid bars 46 on the corresponding side of the vertical diameter of the grid. The surface of rollers 36 is fluted as indicated in the drawings, or spiked or otherwise roughened, to enable them to grip the external surface of shells 26.

Surrounding tube 18 and fixed thereto and rotating therewith within the grid is a cylindrical planing knife 50 having its cutting edge directed forwardly and disposed close to the inner surface of the rearward ends of the grid bars 46. Rollers 36, engaging the outer surface of the shell halves 26, draw them rearwardly along the grid and press the inner surface of their meat layer upon the grid bars 46. As the shells approach the rearward ends of the grid bars, this pressure increases and the grid bars are thus forced into the soft flesh of layer 28 toward the shell 26. As the bars 46 are relatively narrow, the inner part of layer 28 is projected beyond the inner edges of the bars and, as the shells are advanced, this inner portion of the meat layer is sheared off by the planing knife 50, as shown in Fig. 2. The meat and juice thus removed from the shells are collected in a trough (not shown) in the base of casing 20.

Tube 18 is continuously rotated by worm gear connection to a shaft 52, driven by sprocket and gear connection from a shaft 54 which operates coring and trimming machine 24 and which, in turn, is driven by sprocket and chain connection from a main drive shaft 56. Roller operating shaft 38 is driven by sprocket and chain connection from a shaft 58 which in turn is driven by chain and sprockets from shaft 52.

The apparatus as so far described is substantially like that shown in my Patent No. 2,195,193 mentioned above. Its operation is to remove the cylinder of meat 22 from within the pineapple shell 26, divide the shell with its adherent, irregular layer of meat 28 into two halves, and to plane off the inner part of this meat layer, without substantially changing the natural transverse curvature of the shells. There remains upon the shells a meat layer 28' of reduced thickness having a substantially smooth inner surface and a depth determined by the width of the grid bars 46 at the point of action of the planing knife 50, and also by the predetermined setting of the rollers 36, which determines the clearance between the roller surface and the outer diameter of grids 46; this setting having previously been adjusted by the hand wheels 44.

In the prior machine, the edible substance of the meat layer 28' was not removed from the shells and was wasted. Consequently, it was desirable to make this layer as thin as possible and there was a tendency to adjust the rollers 36 too close to the grid so that the cut made by the knife 50 was within the zone of penetration of the eyes 30 and portions of the eye growth were sheared off with the flesh, contaminating the substance recovered. In the practice of the present invention, the machine can be adjusted so that the cut by the knife 50 is clear of the zone of maximum eye penetration without wastage of edible substance, as I have found that the juice of the layer 28', as thick as or thicker than the said zone, can be effectively recovered by the action of the novel mechanism of the invention now to be described.

Referring again to the drawings, and particularly to Figs. 2 and 3, there is provided upon the rear face of each of the casings 40, a rigid transverse extension 60 upon the outer edge of which is horizontally slidably mounted a supporting sleeve member 62. Within the member 62 is rotatably held, by means of a thrust bearing 64 and journal bearing 65, the upper end of a vertically disposed shaft 66. Upon the lower end of shaft 66 is fixedly mounted a generally spherical member 68. As shown, member 68 is a hollow body of metal, coated on its surface with a layer of rubber 70, and provided centrally with a sleeve or socket 72 into which the lower end of shaft 66 extends and is secured by a nut 74.

As shown in Fig. 3, the radius of curvature of the surface of member 68 and the surface layer 70 is slightly less than the radius of curvature of the concave surface of the adjacent roller 36 and it is positioned with its axis parallel to the axis of the roller 36 and with its center substantially in the horizontal plane of the center of said roller.

Shaft 66 and member 68 are continuously rotated about their common vertical axis in timed relation to the speed of rotation of the roller 36 and oppositely thereto, as shown by means of a gear 76, fixed to shaft 66 between the sleeve member 62 and member 68, which meshes with a driving gear 78 fixedly connected to the upper end of the corresponding roller 36. As indicated in the drawings, gear 76 is smaller than gear 78 so that shaft 66 is rotated at a faster rate than roller 36. A circular guard plate 79 fixed to sleeve 62 overlies and protects the gear 76.

As best shown in Fig. 3, extensions 60 are provided in their interior with a longitudinal bore 80, and with a horizontal slot 82 communicating with said bore, and extending through the vertical outer wall of said extensions against which the sleeve member 62 is slidably seated. Within said bore 80 is loosely seated the enlarged head of a pin 84 which extends outwardly through the slot 82 and through a horizontal tube 86 fixed to the sleeve member 62. Pin 84 is provided on its outer end with a screw thread meshing with the interior thread of a hand wheel 88. By turning hand wheel 88 in one direction, pin 84 is drawn outwardly until its head is clamped tightly against the outer wall of bore 80, thus locking sleeve member 62 against sliding movement along the extension 60. When the wheel is turned in the opposite direction, this clamp is released and sleeve 62 is free to slide longitudinally of extension 60, pin 84 sliding correspondingly in bore 80 and slot 82.

Each casing 40 is provided at its inner end with a rearwardly projecting lug 90 provided with a suitably threaded aperture in which is received a bolt 92 which projects therefrom toward the corresponding sleeve member 62. Engagement of the head of each bolt 92 with a portion of the corresponding sleeve 62 limits the inward sliding of said sleeve. Bolts 92 are releasably held in predetermined position by means of lock nuts 94.

By sliding one of the sleeve members 62 along the corresponding extension 60, the axis of the member 68 suspended therefrom is shifted gradually toward or away from the axis of the corresponding roller 36, so that a fine adjustment of the clearance between the surface of the roller and of the member 68 is permitted. This clearance should be greater than the normal thickness of the shells 26 and less, but preferably only slightly less, than the combined thickness of the shells and the meat layer 28'.

As the front end of a shell leaves the planing edge 50 it is carried by the concave roller 36 past a short, correspondingly convex curved guide 96, about the axis of roller 36 until the surface of its meat layer is engaged by the surface 70 of member 68. As above noted, member 68 is rotating at a higher speed than is the roller 36 and its size is such, with reference to the radius of the roller 36, that its surface 70 is moving at a higher speed than is the surface of layer 28' at any point of their mutual contact. The shell is prevented from partaking of the increased speed of the surface 70 by the grip of the rough surface of the roller 36 thereon and also by the fact that the shell, toward its opposite end, is being pressed between the roller and the grid bars 46, or is even not yet completely severed from the pineapple (see Fig. 2), which tends to hold the speed of advance of the shell to the speed of the roller 36.

Surface 70 therefore rubs layer 28' in the direction of movement of the shell. The resultant attrition and pressure exerted parallel to the shell are effective to rupture the juice cells of the layer 28' and substantially completely expel the juice therefrom even though only a light squeeze of the shells, sufficient merely to provide a firm engagement of the surface 70 with the surface of layer 28' is used. Thus, by rotating the surface 70 at a faster rate than the layer 28' is advanced, I provide effective juice expelling forces acting parallel to the shell and I am enabled to avoid the application of heavy opposed pressures normal to the shell and layer 28', as would be necessary if it were attempted to squeeze out the juice by rotating the roll 36 and surface 70 at the same rate.

Since the shells 26 are not subjected to heavy squeezing pressure between the surface of roller 36 and the surface 70, their oils are not expelled and the eyes are permitted to pass freely between these surfaces without being crushed or torn off of the shell. The juice obtained, which flows down the surface 70 and is collected in a suitable receptacle 98, is therefore free from inedible impurities. In addition, the shell is allowed to retain, throughout its treatment, substantially its natural transverse curvature, which prevents cracking of the shell with consequent danger of expulsion of oils and pieces from the shell into the meat and juice recovered, and also prevents jamming of the apparatus. After passing the member 68, the shells are stripped from the roller 36 into a suitable receptacle (not shown).

It is preferable that the roller 36 and member 68 be of sufficient size so that the curvature of their surfaces about their respective axes of rotation is gradual and surface 70 contacts the layer 28' over a zone of substantial width. I have found that rollers 36 of about four inches minimum diameter and members 68 of about eight inches maximum diameter give entirely satisfactory results, rotating the members 68 at about one and a half times the rate of rotation of the rollers.

I have found it distinctly advantageous to employ a single conveyor, such as a roller 36, for carrying each shell portion during the successive planing and rubbing procedures, not only for the sake of economy in mechanism required, but also because the planing operation tends to fix the shell to the surface of the conveyor as is desirable to prevent slip of the shell during the rubbing operation. Separate conveyors may be used for the two operations, but in such case it is desirable to provide some means, corresponding to the grid bars 46 of the form of apparatus shown in the drawings, for pressing the shell onto the conveyor surface in advance of the rubbing device.

It is also desirable and preferred, for reasons above explained, to utilize a conveyor or conveyors, as the rollers 36, adapted to retain substantially the normal transverse curvature of the shells, and to employ co-operating planing and rubbing mechanism adapted to operate on the shells in that form. Other planing devices which flatten the shell may, however, be used and, particularly in such cases, the rubbing device may also be suited to operate upon the shells in a flattened condition, as by the utilization of a cylindrical conveyor roll otherwise corresponding to the roller 36 and a cylindrical rubbing roll otherwise corresponding to the rubbing member 68.

It will be understood that by describing herein a preferred practice and apparatus of the invention, I do not intend to limit the invention thereto and that changes in the details thereof may be made within the spirit and scope of the invention, as defined by the appended claims.

I claim:

1. A method for the recovery of edible juice from a pineapple shell having a layer of meat of substantially uniform depth upon its inner surface which comprises advancing the shell while gripping the surface thereof, rubbing the surface of said layer by advancing a smooth, continuous rubbing surface in contact with the surface of said layer at a faster speed than the speed of advance of said layer surface, and maintaining the rubbing member and shell gripping member so spaced that the rubbing member does not penetrate said layer sufficiently to contact the shell, whereby juice is expelled from said layer by attrition of said rubbing member thereon.

2. A method for the recovery of edible juice from a pineapple shell having a layer of meat of substantially uniform depth upon its inner surface which comprises advancing the shell while gripping the surface thereof, rubbing the surface of said layer by advancing a smooth, continuous rubbing surface in contact with the surface of said layer at a faster speed than the speed of advance of said layer surface, and maintaining the rubbing member and shell gripping member with their surfaces spaced apart a distance greater than the thickness of the shell so that the rubbing member does not penetrate said layer portion sufficiently to contact the shell, whereby juice is expelled from said layer by attrition of said rubbing member thereon without removing substance from the shell.

3. A method for the recovery of edible juice from a pineapple shell having a layer of meat of substantially uniform depth upon its inner surface which comprises advancing the shell while gripping the surface thereof, bending said advancing shell so that the outer surface of said layer is longitudinally expanded relative to its shell engaging surface, rubbing the expanded outer surface of said layer by advancing a smooth, continuous rubbing surface in contact with said layer surface at a faster speed than the speed of advance of said layer surface, and maintaining the rubbing member and the shell gripping member so spaced apart that the rubbing member does not penetrate said layer sufficiently to contact the shell, whereby juice is expelled from said layer by attrition of said rubbing member thereon.

4. A method for the recovery of edible substance from a pineapple shell having a layer of meat of irregular depth upon its inner surface, which comprises planing off part of said layer to leave upon the shell a portion of said layer of reduced thickness and substantially uniform depth, rubbing the surface of said layer portion by advancing a smooth, continuous rubbing surface in contact with the surface of said layer portion at a faster speed than the speed of advance of said layer portion, and maintaining the rubbing member and shell gripping member so spaced that the rubbing member does not penetrate said layer portion sufficiently to contact the shell, whereby juice is expelled from said layer portion by attrition of said rubbing member thereon.

5. A method for the recovery of edible substance from a pineapple shell having a layer of meat of irregular depth upon its inner surface, which comprises planing off part of said layer to leave upon the shell a portion of said layer of reduced thickness and substantially uniform depth, advancing the shell while gripping the surface thereof, rubbing the surface of said layer portion by advancing a smooth, continuous rubbing surface in contact with the surface of said layer portion at a faster speed than the speed of advance of said layer portion, whereby juice is expelled from said layer by attrition of said rubbing member thereon, and during said steps substantially preserving the natural transverse curvature of the shell.

6. In apparatus for the recovery of edible juice from pineapple shells having a thin layer of meat upon their inner surface, the combination of a shell conveyor adapted to grip the outer surface of the shell, a rotary rubbing member having a continuous, smooth rubbing surface arranged to contact the surface of a layer of meat on a said shell advancing on the conveyor, and means for continuously rotating said rubbing member so that the portion of its surface in contact with the surface of a said layer advances in the same direction at a faster speed than said layer is advanced by the conveyor, said conveyor and said rubbing member being spaced apart a distance greater than the thickness of the shell and only slightly less than the combined thickness of the shell and meat layer whereby penetration of the rubbing member into the layer sufficiently to contact the shell and the exertion of crushing pressure on the shell are avoided.

7. Apparatus as described in claim 6 wherein the shell conveyor is a rotating roller and means is provided for pressing the shell on the surface of said roller in advance of contact of the rubbing member with the meat layer on the shell.

8. Apparatus as described in claim 6 wherein the shell conveyor is a rotary roller having its shell engaging surface concavely curved longitudinally of the roller axis to correspond substantially to the natural transverse curvature of the shells and the rubbing member has its rubbing surface correspondingly convexly curved longitudinally of said axis.

9. Apparatus as described in claim 6 wherein means is provided for adjustably fixing the position of the axis of the rubbing member relative to the shell conveyor.

10. In apparatus for the recovery of edible substance from pineapple shells having a layer of meat of irregular depth upon their inner surface, the combination of a grid, a shell feeding roller adapted to grip the outer surface of the shell to feed the shell over the grid while exerting pressure thereon to force the bars of the grid into the layer of meat upon the inner surface of the shell, a knife co-operating with said grid and roller to plane off part of said layer of meat protruding through said grid, a rubbing member, rotatable about an axis parallel to the axis of said roller, arranged to engage the surface of the remaining portion of said layer as the shell is carried beyond the grid by said roller, and means for rotating said member about said axis in a direction opposite to the direction of rotation of said roller and at a higher surface speed than the surface speed of said roller.

11. In apparatus for the recovery of edible substance from pineapple shells having a layer of meat of irregular depth upon their inner surface, the combination of a grid, a shell feeding roller adapted to grip the outer surface of the shell to feed the shell over the grid while exerting pressure thereon to force the bars of the grid into the layer of meat upon the inner surface of the shell, a knife co-operating with said grid and roller to plane off part of said layer of meat protruding through said grid, and a rotary rubbing member arranged to engage the surface of the remaining portion of said layer as the shell is carried beyond the grid by said roller to rupture the juice cells of said layer portion and expel the juice therefrom, the shell gripping surface of the said feed roller being concavely curved longitudinally of the roller axis to correspond substantially to the natural transverse curvature of the shells, and the meat engaging surfaces of said grid, knife and rubbing member being correspondingly convexly curved longitudinally of said axis.

ALBERT ERNEST STANLEY.